United States Patent
Kibel

(10) Patent No.: US 11,064,686 B2
(45) Date of Patent: Jul. 20, 2021

(54) FISHING LIGHT ATTRACTOR AND A METHOD OF FISHING THEREWITH

(71) Applicant: Fishtek Marine Ltd, Dartington (GB)

(72) Inventor: Ben Kibel, Hampstead (GB)

(73) Assignee: FISHTEK MARINE LTD, Dartington (GB)

( * ) Notice: Subject to any disclaimer, the term of this patent is extended or adjusted under 35 U.S.C. 154(b) by 182 days.

(21) Appl. No.: 16/401,054

(22) Filed: May 1, 2019

(65) Prior Publication Data
US 2019/0254267 A1 Aug. 22, 2019

Related U.S. Application Data

(63) Continuation of application No. PCT/GB2017/053231, filed on Oct. 26, 2017.

(30) Foreign Application Priority Data

Nov. 1, 2016 (GB) .................................... 1618409

(51) Int. Cl.
*A01K 85/01* (2006.01)
*A01K 91/18* (2006.01)
(Continued)

(52) U.S. Cl.
CPC .............. *A01K 85/01* (2013.01); *A01K 91/06* (2013.01); *A01K 91/18* (2013.01); *F21L 4/00* (2013.01);
(Continued)

(58) Field of Classification Search
CPC ........ A01K 85/01; A01K 91/06; A01K 91/18; F21L 4/00
(Continued)

(56) References Cited

U.S. PATENT DOCUMENTS 1,338,528 A * 4/1920 Reinewald ............. A01K 75/02
362/186
4,109,405 A * 8/1978 Ito .......................... A01K 85/01
200/81 R
(Continued)

FOREIGN PATENT DOCUMENTS

ES 2211304 7/2004
GB 2492788 1/2013
(Continued)

OTHER PUBLICATIONS

WIPO, International Search Report and Written Opinion in corresponding PCT application PCT/GB2017/053231, dated Jan. 17, 2018.

*Primary Examiner* — Christopher P Ellis
(74) *Attorney, Agent, or Firm* — Ryan Alley IP

(57) ABSTRACT

It is well known that light attracts fish at night, and that any artificial fishing light attractor is preferably submersible to avoid significant amounts of light being reflected off the surface of the water. Single-use glow sticks are known to be used as submersible fishing light attractors; however, these cannot be turned off, can be used only once, and are often of relatively low intensity. The present invention provides a powered light source with an intensity higher than conventional glow sticks that may be attached to fishing lines. To achieve this, the light source is configured such that, when the light source is placed at depth, external water pressure acts to increase sealing against ingress of water.

14 Claims, 2 Drawing Sheets

(51) Int. Cl.
*F21L 4/00* (2006.01)
*A01K 91/06* (2006.01)
*F21V 23/00* (2015.01)
*F21V 31/00* (2006.01)
*F21Y 115/10* (2016.01)

(52) U.S. Cl.
CPC .......... *F21V 23/005* (2013.01); *F21V 31/005* (2013.01); *F21Y 2115/10* (2016.08)

(58) Field of Classification Search
USPC ......................................................... 43/17.5
See application file for complete search history.

(56) References Cited

U.S. PATENT DOCUMENTS

| | | | | |
|---|---|---|---|---|
| 4,437,256 | A | 3/1984 | Kulak | |
| 4,569,146 | A * | 2/1986 | Lowrance | A01K 97/02 |
| | | | | 43/17.1 |
| 5,063,700 | A * | 11/1991 | Kiefer | A01K 85/01 |
| | | | | 43/17.6 |
| 5,070,437 | A * | 12/1991 | Roberts, Sr. | F21V 21/088 |
| | | | | 362/158 |
| 5,974,721 | A * | 11/1999 | Johnson | A01K 93/02 |
| | | | | 43/17 |
| 6,098,331 | A * | 8/2000 | Kim | A01K 85/01 |
| | | | | 43/17.6 |
| 6,161,323 | A * | 12/2000 | Kageyama | A01K 97/00 |
| | | | | 43/17.5 |
| 6,481,148 | B1 * | 11/2002 | Lindgren | A01K 85/01 |
| | | | | 362/158 |
| 7,082,711 | B2 * | 8/2006 | Adams | A01K 93/00 |
| | | | | 43/17.5 |
| 7,131,231 | B1 * | 11/2006 | Lee | A01K 93/02 |
| | | | | 43/17 |
| 7,192,156 | B1 | 3/2007 | Hung | |
| 9,482,415 | B1 * | 11/2016 | Schwartz | A01K 85/01 |
| 2002/0178641 | A1 * | 12/2002 | Kent | A01K 75/02 |
| | | | | 43/17.5 |
| 2004/0216355 | A1 * | 11/2004 | Gore | A01K 85/01 |
| | | | | 43/17.5 |
| 2008/0148621 | A1 * | 6/2008 | Laser | A01K 97/00 |
| | | | | 43/4 |
| 2009/0249679 | A1 * | 10/2009 | Huppert | A01K 95/00 |
| | | | | 43/43.14 |
| 2010/0058643 | A1 * | 3/2010 | Morris | A01K 93/00 |
| | | | | 43/17.5 |
| 2011/0099882 | A1 | 5/2011 | Young | |
| 2012/0079755 | A1 * | 4/2012 | Torres | A01K 97/02 |
| | | | | 43/17.5 |
| 2013/0014424 | A1 * | 1/2013 | Weishner | A01K 97/02 |
| | | | | 43/17.5 |
| 2013/0014425 | A1 | 1/2013 | Reynolds et al. | |
| 2015/0173337 | A1 | 6/2015 | Reed | |
| 2016/0000055 | A1 * | 1/2016 | Best | A01K 97/05 |
| | | | | 43/17.5 |
| 2018/0192631 | A1 * | 7/2018 | Noga | F21K 9/20 |

FOREIGN PATENT DOCUMENTS

| | | |
|---|---|---|
| KR | 20030090387 | 11/2003 |
| WO | 9933337 | 7/1999 |
| WO | 0191549 | 12/2001 |

* cited by examiner

[Fig. 1]
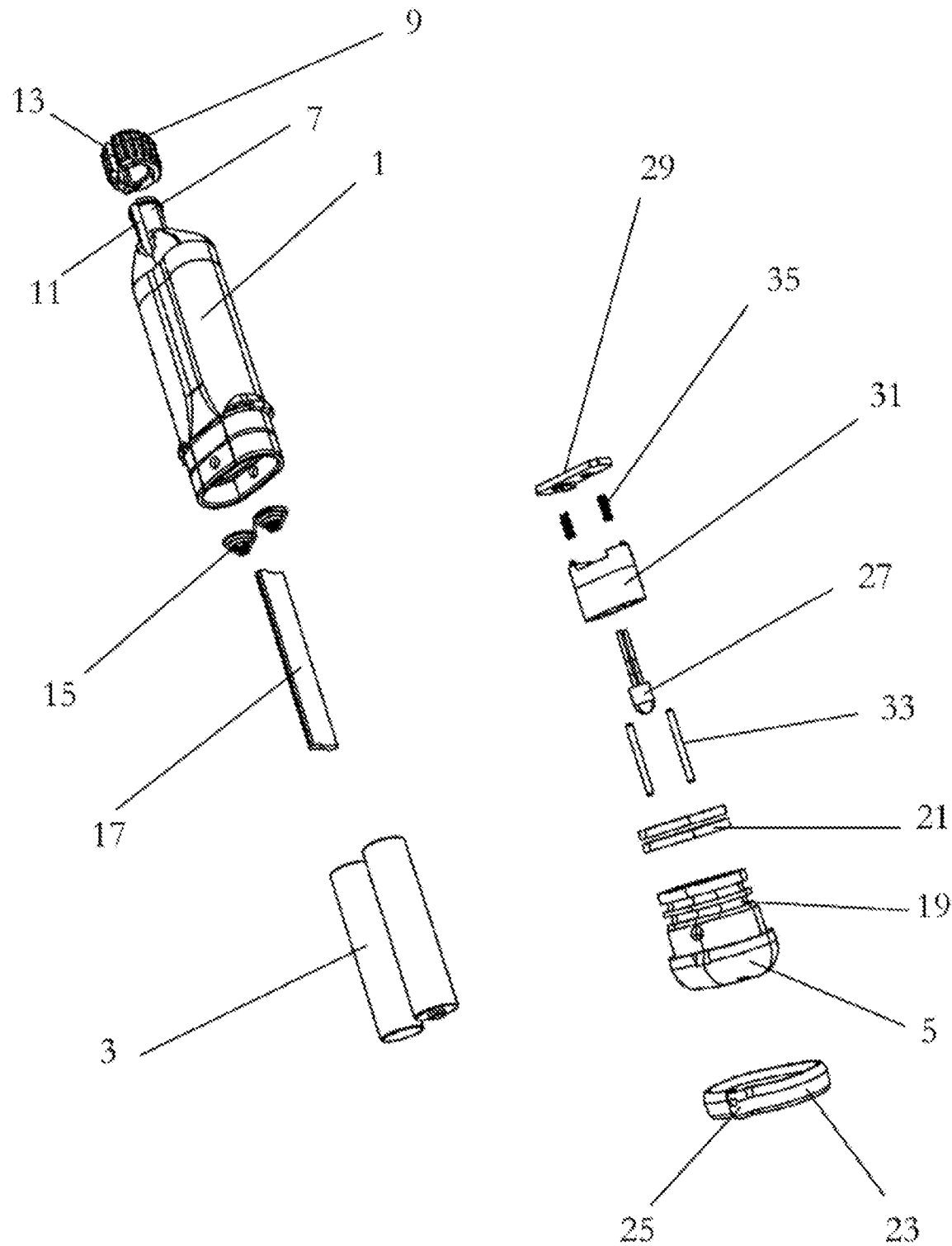

[Fig. 2]
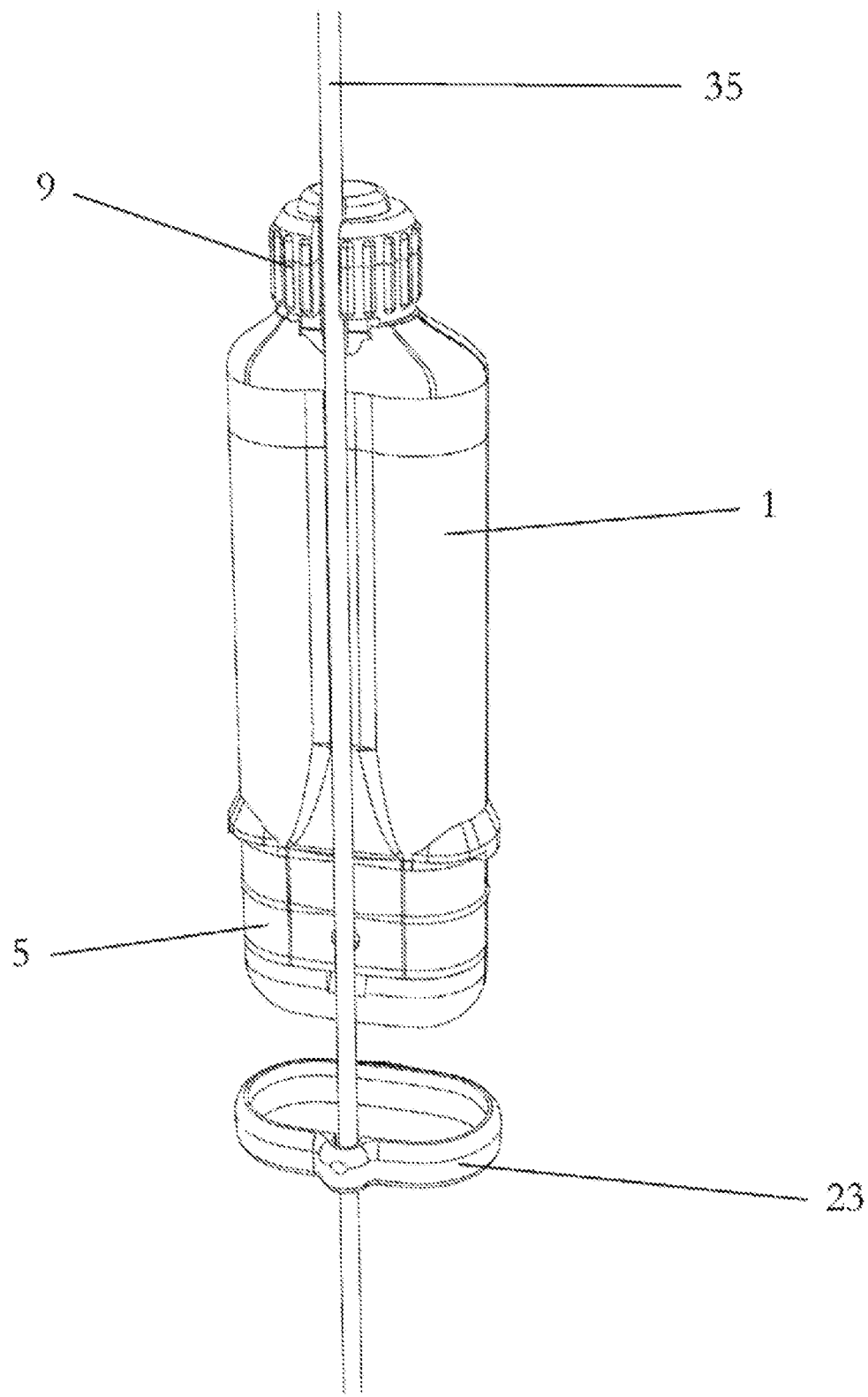

FISHING LIGHT ATTRACTOR AND A METHOD OF FISHING THEREWITH

RELATED APPLICATIONS

This application claims priority under 35 U.S.C. § 120 to, and is a continuation of, co-pending International Application PCT/GB2017/053231, filed Oct. 26, 2017 and designating the US, which claims priority to GB Application 1618409.5, filed Nov. 1, 2016, such GB Application also being claimed priority to under 35 U.S.C. § 119. These GB and International applications are incorporated by reference herein in their entireties.

BACKGROUND

Field

The present invention relates generally to a fishing light attractor and a method of fishing using such a fishing light attractor and finds particular, although not exclusive, utility in longline fishing.

Longline fishing is a commercial fishing technique that uses a main line of, for instance, approximately 40 km long (having an approximately 6 mm diameter and having a breaking strength of approximately 1-2 tonnes), with baited hooks attached at intervals along the main line by means of dropper lines. Longline fishing commonly target swordfish, tuna, halibut, sablefish and many other species.

It is well known that light attracts fish at night, in particular blue/green light as this is at the peak sensitivity of fish vision. It is also desirable that an artificial fishing light attractor be submersible to avoid significant amounts of light being reflected off the surface of the water, and therefore being wasted.

Single-use glow sticks are known to be used as submersible fishing light attractors, as they are a self-contained, short-term light-sources that comprise a translucent plastic tube containing isolated liquid substances that, when combined (e.g. by breaking the barrier isolating the substances from one another), make light through chemiluminescence. The light cannot be turned off once activated, can be used only once, and is often of relatively low intensity.

SUMMARY

According to a first aspect of the present invention, there is provided a fishing light attractor for attaching to a fishing line, the fishing light attractor comprising: a waterproof housing having: a first part; and a second part comprising a plug portion configured to be insertable within an opening in the first part to form the waterproof housing wherein the compressive strength across the plug portion is substantially more than the compressive strength of the first part across the opening; an LED provided within the housing; a power source within the housing for powering the LED; the housing having a translucent portion for allowing light from the LED to pass therethrough; and a line attachment mechanism located on the housing.

In this way, a powered light source (which may have an intensity higher than conventional glow sticks) is provided that may be attached to dropper lines in long line fishing. Furthermore, when the fishing light attractor is placed at depth, water pressure on the housing will compress the first part across the opening more than it will compress the plug portion within the opening. Thus, an increase in external water pressure actually acts to increase sealing against ingress of water. The compressive strength across the plug portion may be at least 10%, 20%, 50%, 100% and/or 200% more than the compressive strength of the first part across the opening.

The housing may be waterproof to a depth of at least 1 m, 5 m, 10 m, 100 m, 500 m, 1000 m and/or 3000 m.

The LED may be a conventional light emitting diode. The LED may be configured to emit light that is blue and/or green in colour. Alternatively, the LED may be configured to emit light of any other colour or combination of colours, including white. There may be only one, or a plurality of LEDs.

The translucent portion may comprise a transparent portion; alternatively the translucent portion may comprise a portion that is substantially non-transparent. The translucent portion may be tinted; that is, the translucent portion may permit light of only certain wavelengths from the LED to pass therethrough. The translucent portion may comprise polycarbonate material. Alternatively or additionally, the translucent portion may comprise plastics or similar material and/or may be injection moulded.

Other portions of the housing may be opaque or may also be translucent; for instance, the entire housing may be translucent. The opaque portion may comprise polycarbonate material. Alternatively or additionally, the opaque portion may comprise nylon or similar material and/or may be injection moulded.

The housing may be assembled and disassembled such that the contents of the fishing light attractor may be inspected, replaced and/or repaired. The second part may be configured to be a close fit within the opening in the first part. The fit may be a snug fit and/or friction fit.

The housing may further comprise an O-ring located in use between the plug portion of the second part and the opening in the first part.

In this way, the O-ring may help form a seal between the first part and the second part. The O-ring may comprise rubber, silicone and/or synthetic rubber. The O-ring may be located to fit around an external perimeter of the plug portion and/or to fit around an internal perimeter of the opening. The housing may comprise only one, two, three or more such O-rings.

The housing may further comprise a groove for receiving the O-ring therein.

In this way, movement of the O-ring along the axis of the plug portion and/or opening may be prevented. The groove may be an annular groove. The groove may be located to extend around an external perimeter of the plug portion and/or to extend around an internal perimeter of the opening. The housing may comprise only one, two, three or more such grooves, for instance one for each respective O-ring.

In this way, when the fishing light attractor is placed at depth, water pressure on the housing will compress the first part across the opening more than it will compress the plug portion within the opening, which may act to reduce a region around any O-rings through which they may extrude. Thus, an increase in external water pressure actually acts to increase sealing against ingress of water.

The plug portion may be substantially solid, may comprise a perimeter wall having a thickness greater than a thickness of a perimeter wall around the opening, and/or may comprise a material having an intrinsic compressive strength substantially more than the intrinsic compressive strength of the material from which the first part is composed. The material from which the housing is made may form a wall having a thickness of between 0.5 and 5 mm, in particular between 1 and 3 mm, more particularly approximately 1.5 mm.

Alternatively or additionally, the plug portion may comprise a body therein, the body arranged to prevent compression of the plug portion.

The fishing light attractor may further comprise a printed circuit board to which the LED is electrically coupled.

For instance, the LED may be soldered onto the printed circuit board (PCB).

The printed circuit board may be located in use within the first part, and the LED may be located in use within the second part.

An electrical contact may extend from the printed circuit board to the LED through the body, such that coupling of the LED to the printed circuit board couples the printed circuit board to the body.

The power source may comprise at least one battery, for instance only one, two, three, four or more batteries. The or each battery may comprise a positive and a negative terminal at a first end thereof. In this way, the or each battery may be connected directly to the printed circuit board.

Alternatively, the or each battery may comprise a positive terminal at a first end thereof and a negative terminal at a second end thereof, opposite the first end. In cases where the power source comprises an odd number of such batteries, an electrical contact must be provided at an end of (one of) the battery/batteries opposite the printed circuit board, and an electrical conductor must be provided between that electrical contact and the printed circuit board.

In cases where the power source comprises an even number of such batteries, the batteries may be connected together in series such that no electrical conductor is required to extend adjacent to the length of the battery.

The fishing light attractor may further comprise an electrical contact disposed within the first part at an end opposite the opening, the electrical contact configured to electrically connect a positive terminal of a first battery with a negative terminal of a second battery in series, wherein the first and second batteries form the power source.

The fishing light attractor may further comprise a longitudinal divider extending between the opening and the end of the first part opposite the opening, the divider configured to hold the electrical contact in place.

In this way, easy assembly of the attractor may be enabled. In addition, the divider may also form a dividing wall between adjacent batteries, optionally forming a guide for insertion of batteries therein. Furthermore, presence of the divider within the first part may substantially prevent compression of the walls of the first part; i.e. the divider may be a reinforcing member.

In alternative embodiments, the printed circuit board may be disposed within the first part at an end opposite the opening, and the electrical contact may be disposed on the plug portion.

The batteries may be for instance AA, AAA, C or D batteries, or any other suitable form of batteries.

The fishing line attractor may be further configured to activate the LED upon submersion in water.

The fishing line attractor may further comprise a pair of water contact pins in electrical communication with the printed circuit board and arranged to project out of the housing such that water present between the projecting ends of the pins completes an electrical circuit causing the LED to illuminate.

The water contact pins may project out of the housing by less than 5 mm, 4 mm, 3 mm, 2 mm and/or 1 mm. The water contact pins may extending through the housing, the first part, the second part, the plug portion and/or the body by virtue of an interference fit to prevent water ingress. For instance, at least 5N of force may be required to located the pins within respective holes in the housing (or portions of the holes), in particular at least 20N, more particularly at least 30N, 50N or 70N; alternatively and/or additionally, the pins may be glued or otherwise sealed within the respective holes (e.g. by rubber tubing or with O-rings).

The water contact pins may be located in electrical contact with the printed circuit board via springs.

In this way, manufacturing tolerances can be reduced, and soldering can be avoided. This is advantageous as soldering of the water contact pins to the printed circuit board could cause an undesirable amount of heat to pass along the pins, which may thermally damage the housing.

The line attachment mechanism comprises at least two line connectors.

In this way, the fishing light attractor may be attached in-line with the fishing line to which it is attached.

Alternatively, the line attachment mechanism may comprise only one line connector. The or each line connector may be suitable for connection to a fishing line having a diameter of between 0.5 mm and 3 mm, in particular between 1 mm and 2.5 mm, more particularly approximately 2 mm.

The or each connector may comprise a clip, loop, band, clamp or any other form of connector. The or each connector may be substantially elastic and/or resilient such that it may grip the line to which it is connected.

According to a second aspect of the present invention, there is provided a method of fishing comprising the steps of: providing the fishing light attractor according to the first aspect; providing a fishing line; attaching the fishing light attractor to a fishing line; and submerging the fishing light attractor on the fishing line such that the LED illuminates.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

FIG. 1 is an exploded view of a fishing light attractor.

FIG. 2 is a perspective view of the fishing light attractor of FIG. 1 shown partially assembled and in the process of being attached to a fishing line.

DETAILED DESCRIPTION

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "connected", used in the description, should not be interpreted as being restricted to direct connections only. Thus, the scope of the expression "a device A connected to a device B" should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other. For instance, wireless connectivity is contemplated.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any embodiment or aspect of the invention may be combined in any suitable manner, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances.

The principles of the invention will now be described by a detailed description of at least one drawing relating to exemplary features of the invention. It is clear that other arrangements can be configured according to the knowledge of persons skilled in the art without departing from the underlying concept or technical teaching of the invention, the invention being limited only by the terms of the appended claims.

FIG. 1 is an exploded view of a fishing light attractor comprising a main body 1 into which may be inserted two batteries 3 (for instance AAA batteries), and which may be sealed by a cap 5. At an upper end of the main body 1 is provided a peg 7 onto which a keeper 9 may be rotatably received. The peg 7 and keeper 9 may be mutually threaded, or may be substantially blind. For instance, the peg 7 may comprise an enlarged head to prevent accidental removal of the keeper 9 therefrom. The peg 7 comprises a vertical groove 11 suitable for receiving a fishing line longitudinally therein. The keeper 9 comprises a vertically-oriented slot 13 configured such that, when aligned with the vertical groove 11, a fishing line may be inserted or removed from the groove 11 in a substantially radial (rather than longitudinal) direction.

Two coiled springs 15, which are electrically coupled together, may be inserted into the main body 1. For instance, as shown, the two coiled springs 15 may be formed from a single piece of wire. The coiled springs 15 may be positioned inside the main body at the upper end thereof. The coiled springs 15 are held in place by a longitudinal insert 17 that is configured to be inserted and held by a friction fit between two opposing walls of the main body 1. Each of the batteries 3 may be inserted into the main body 1 on one respective side of the longitudinal insert 17, to engage with the springs. In this way, the negative terminal of one of the batteries may be directly coupled via the coiled springs 15 to the positive terminal of the other one of the batteries.

The cap 5 includes two coaxial grooves 19 on an outer surface thereof configured to receive respective O-rings 21 therein. The cap 5 may then be inserted into the opening at the lower end to the main body 1, with the O-rings 21 sealing the join to form a water-tight volume within the main body 1.

A ring 23 may be slotted over the cap 5 and onto the body 1. It may be secured in place with a friction fit, and/or preferably may click into place as it passes over a ridge on the body 1. The ring 23 is provided with a projecting hoop 25 within which may be received a fishing line.

The cap 5 has a substantially translucent end to allow light from an LED 27 to pass therethrough. The LED 27 is powered by the batteries 3, via a printed circuit board 29 to which the LED 27 is connected, and against which the batteries 3 are in electrical contact. The enlarged head of the LED 27 holds a spacer 31 against the printed circuit board 29, as the wire connectors of the LED 27 pass through an interior of the spacer 31 and are connected (e.g. by soldering) to the printed circuit board 29.

The spacer 31 is inserted within the cap 5 immediately underneath the O-ring rings 21 such that the spacer 31 prevents compression of the cap 5 inwards radially, which would otherwise cause the seal of the cap 5 within the main body 1 to fail.

Also electrically incorporated with the printed circuit board 29 is a switch. In the arrangement shown, the switch is a water-activated switch; that is, two electrical probes 33 extend from the printed circuit board through holes in the cap 5 to an exterior of the fishing light attractor. Presence of water (in particular salt water) between the two projecting ends of the probes 33 completes a circuit that triggers activation of the LED 27. The probes 33 are in electrical communication with the printed circuit boards via respective coil springs 35. Each probe is also arranged to pass through a respective hole within the spacer 31.

FIG. 2 is a perspective view of the fishing light attractor of FIG. 1 shown with the cap 5 inserted into the main body 1 to form a water-tight volume. A fishing line 35 has been inserted through slot 13 into groove 11 on the main body 1, and into projecting hoop 25 of the ring 23. Securing of the device to the fishing line 35 is completed by rotating the keeper 9 such that the slot 13 does not align with groove 11, and sliding the ring 23 over the cap 5 and onto the body 1.

The invention claimed is:

1. A fishing light attractor for attaching to a fishing line, the fishing light attractor comprising:
    a waterproof housing having:
    a first part; and
    a second part comprising a plug portion configured to be insertable within an opening in the first part to form the waterproof housing wherein the compressive strength across the plug portion is substantially more than the compressive strength of the first part across the opening, wherein the plug portion includes a body insertable into the plug portion and arranged to prevent compression of the plug portion;
    an LED provided within the housing;
    a power source within the housing for powering the LED;
    the housing having a translucent portion for allowing light from the LED to pass therethrough; and
    a line attachment mechanism located on the housing.

2. The fishing light attractor of claim 1, wherein the housing further comprises an O-ring located in use between the plug portion of the second part and the opening in the first part.

3. The fishing light attractor of claim 2, wherein the housing further comprises a groove for receiving the O-ring therein.

4. The fishing light attractor of claim 1, further comprising a printed circuit board to which the LED is electrically coupled.

5. The fishing light attractor of claim 4, wherein the printed circuit board is located in use within the first part, and the LED is located in use within the second part.

6. The fishing light attractor of claim 5, when dependent directly or indirectly upon claim 4, wherein an electrical contact extends from the printed circuit board to the LED through the body, such that coupling of the LED to the printed circuit board couples the printed circuit board to the body.

7. The fishing light attractor of claim 1, further comprising a battery electrical contact disposed within the first part at an end opposite the opening, the electrical contact configured to electrically connect a positive terminal of a first battery with a negative terminal of a second battery in series, wherein the first and second batteries form the power source.

8. The fishing light attractor of claim 7, further comprising a longitudinal divider extending between the opening and the end of the first part opposite the opening, the divider configured to hold the battery electrical contact in place.

9. The fishing line attractor of claim 1, further configured to activate the LED upon submersion in water.

10. The fishing line attractor of claim 9, further comprising a pair of water contact pins in electrical communication with the printed circuit board and arranged to project out of the housing such that water present between the projecting ends of the pins completes an electrical circuit causing the LED to illuminate.

11. The fishing light attractor of claim 10, wherein the water contact pins are located in electrical contact with the printed circuit board via springs.

12. The fishing light attractor of claim 1, wherein the line attachment mechanism comprises at least two line connectors.

13. A method of fishing comprising the steps of:
    providing the fishing light attractor of claim 9;
    providing a fishing line;
    attaching the fishing light attractor to a fishing line; and
    submerging the fishing light attractor on the fishing line such that the LED illuminates.

14. A fishing light attractor for attaching to a fishing line, the fishing light attractor comprising:
    a waterproof housing including,
    a first part, and
    a second part shaped to insert inside of and seal with the first part to form the waterproof housing, wherein the second part includes a groove where the second part inserts inside the first part;
    an O-ring shaped to seat in the groove of the second part and seal the first part and the second part,
    a spacer shaped to fit inside and be radially surrounded by the second part under the groove, wherein the spacer is configured to prevent radial compression of the second part so that the first part will compress relatively into the second part at the groove under water pressure;
    an LED within a translucent portion of the housing;
    a power source for the LED; and
    a line connector.

* * * * *